Patented Mar. 31, 1931

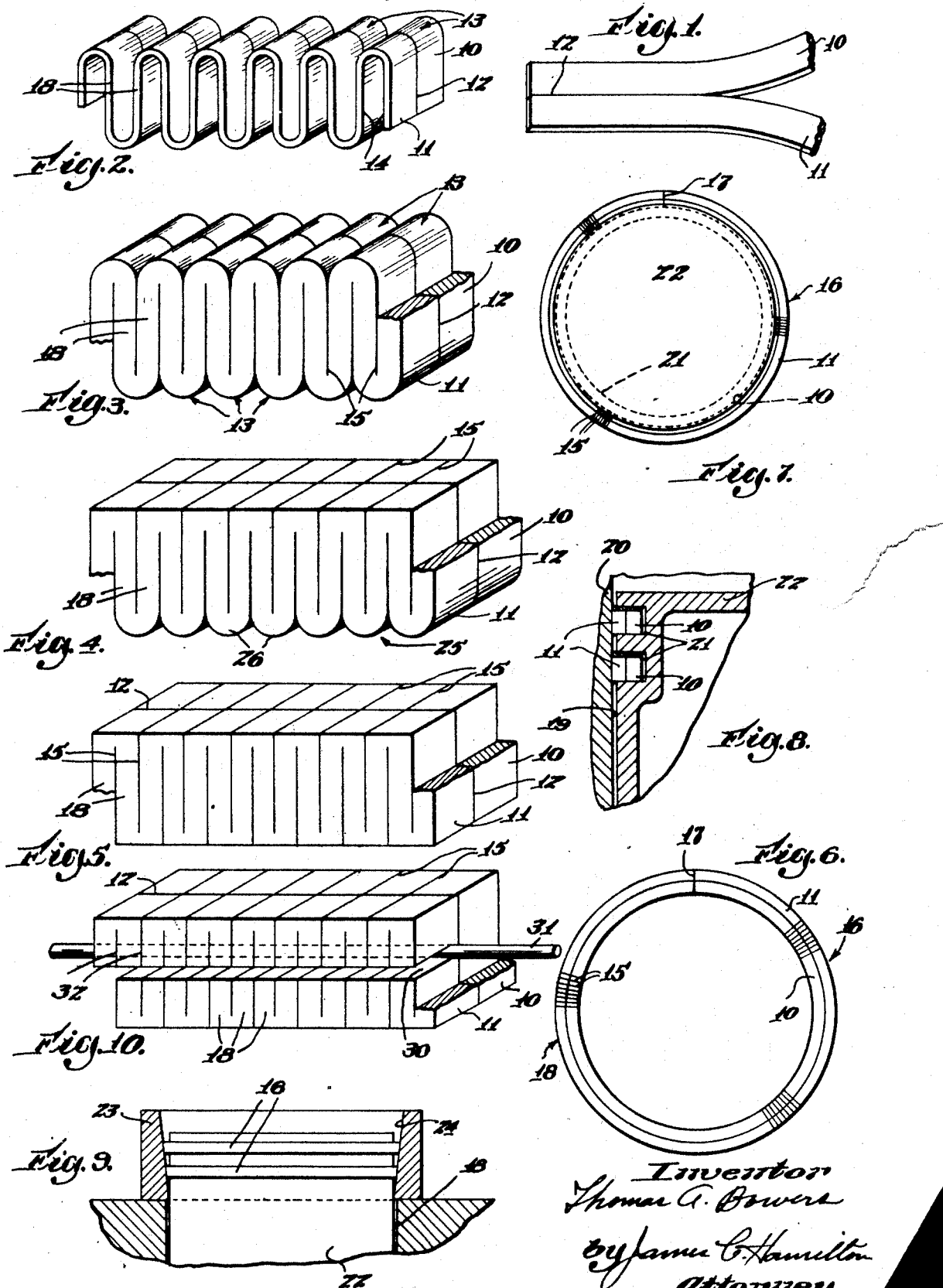

1,798,927

UNITED STATES PATENT OFFICE

THOMAS A. BOWERS, OF BOSTON, MASSACHUSETTS, ASSIGNOR TO PRESSED PISTON RING COMPANY, A CORPORATION OF MASSACHUSETTS

SINGLE-PLY DUPLEX METAL PACKING RING WITH INCLOSED EXPANDER

Application filed October 11, 1930. Serial No. 488,082.

My present invention relates to packing rings and more particularly to packing rings for use in combination with reciprocating pistons which are used in steam engines, internal combustion engines, air compressors, pumps and the like.

In the engineering field it is a well known and universally recognized fact that a packing ring must fit snugly in the cylinder bore of the engine at all points around the periphery of the ring in order to prevent leakage of compression and oil, and that an ideal piston ring should have some of the characteristics of rubber but at the same time stand up under heat, friction and other elements to which it is exposed, which, of course, rubber would not do.

Heretofore, practically all packing rings for pistons have been made from cast metal such as cast iron, either in one form or another in which the ring is split at one point on its side by cutting a section of the ring away. A ring of this type normally presents a periphery which is a true circle except where the slot or cut-away portion occurs. This normal periphery is larger in diameter than the bore of the cylinder in which it is to be placed and is reduced in diameter to fit such bore by pressing the ring together at the cut-way portion. When a ring of this character is so pressed together for the purpose of reducing its diameter for insertion in a cylinder bore in combination with a piston, the natural formation or shape of the ring is slightly oval in shape about its periphery and in order to force it into the bore of the cylinder the back sides of the ring with respect to the slotted side must be deformed or bent outward against the walls of the cylinder bore. This is against the natural reaction of the ring. The result of this deformation is to create an unequal lateral thrust against the wall of the cylinder varying at different points about the wall and reaching a maximum point adjacent that portion of the ring near the slot. This effect is an inherent feature with all cast metal rings of this type which results in wearing the ring thinner at one point than another and wearing the cylinder bore out of round also, to the end that eventually the sides of the ring remote from the slotted side tend to recede from the wall of the cylinder and allow compression to blow by the piston and oil to pass in an opposite direction. There are also other forces in operation in a reciprocating engine tending to increase the oval shape of the cylinder bore, such as piston slap and piston side thrust caused by the revolutions about the crank shaft and excessive clearance between the cylinder wall and piston which may be to some extent traceable to worn rings.

Many attempts have been made in the past to construct a metal packing ring for pistons and the like which will stand up mechanically and give uniform flexibility on the cylinder wall, such as relatively thin cast metal rings with separate expander units located behind the ring for the purpose of holding the deformed shape against the cylinder wall in a more even degree of side thrust, and while such rings do accomplish the result of forming up to the out-of-round cylinder bore, yet it does so at the expense of the cylinder wall because of increased friction caused by the extremely high lateral side thrust on the cylinder walls. Most rings of this class, as well as modified types, are open-ended rings—that is, the ends of the slots do not fully close as clearance must be left to allow for expansion under heat.

My present invention, however, is a closed end ring such that the two ends are in contact with each other, the expansion of the ring being taken up by the multiplicity of laminations comprising the body of the ring itself.

In my ring there may be as many as several hundred or more laminations substantially arranged in a vertical plane with respect to the cylinder wall, the laminations coacting against each other in a resilient and compressible manner. My complete ring is made with a diameter normally oversized with respect to the cylinder bore and when inserted in the bore the piston with rings attached may be pulled down through a tapering cone, the small end of which is approximately the size of the cylinder bore as it enters the cylinder block. This reduction in diameter creates an outward thrust against the cylinder wall uniformly the same at every fraction of a degree about the circumference of the ring. If the bore of the cylinder is slightly out of round as is the case where new rings are necessary, the extreme flexibility of my ring allows it to conform to the contour of the cylinder bore without requiring any appreciable amount of thrust at that point over any other point about the circumference of the ring. If my ring is made of the same material or of material having the same degree of hardness as in the cast metal type previously discussed, it is readily apparent that my ring will greatly outwear the prior ring without allowing any gases to blow by. Therefore, I can use a metal of a softer character than the prior rings, such as bronze, and attain the same length of life as would be present in the prior cast metal ring, but, in so doing, I have reduced the wear on the cylinder walls, thereby prolonging the life and efficiency of the motor.

The amount of compressibility present in my ring depends upon the gauge and kind of metal used—that is, the smaller the gauge the greater the number of laminations, and the greater the temper of the material used the greater the expansibility. As the periphery of the ring wears the spaces between the laminations slightly expand although such expansion would not be perceptible at any one point with the naked eye and when the ring has worn sufficiently on its periphery for the spaces between the laminations to fully expand to their normal limits the ring will be due for replacement, and such replacement may be accomplished many times without reboring the cylinder walls while the length of life of any one ring may be approximately as long as in a cast iron ring, assuming that the proper material is used, this being made possible by the much lighter side thrust used in my ring over the cast metal types.

While my ring is ideally suited for replacement purposes to correct the out-of-round condition of the cylinder bore, yet, it is also ideally suited for new installation work because a ring of this character will greatly prolong the length of life of the cylinder bore which means more engine efficiency in every phase of the motor.

My improved packing ring is composed of sheet metal made up in various forms and shapes and because of this fact is sub-divided in numerous patent applications, any one of which is generic to the above description.

The principal object of my present invention is an improved packing ring for pistons and the like:

Another object is a packing ring which is compressible and elastic and capable of conforming to the contour of an out-of-round cylinder bore:

Another object is a packing ring which may be provided with a wearing surface on the cylinder wall of an engine which surface is relatively soft but having an inner opposite surface which may be hard or tempered metal:

Other objects and novel features comprising the construction and operation of my invention will appear as the description of same progresses.

Fig. 1 shows two ribbons butted together at one edge of each ribbon and then welded:

Fig. 2 shows another step in which the material illustrated at Fig. 1 has been alternately folded to form an open corrugated ribbon of duplex metal:

Fig. 3 shows the open corrugations of Fig. 2 closed up in contact:

Fig. 4 shows rounded ends of the corrugation on the stop of the material hammered off into a flat plane:

Fig. 5 shows both top and bottom edges hammered into a flat plane:

Fig. 6 shows the material illustrated in Figs. 4 and 5 formed into a complete piston packing ring:

Fig. 7 shows the ring composed of either type shown in Fig. 4 or Fig. 5 inserted in the packing ring groove of a piston:

Fig. 8 illustrates a segmented cross-section taken through one of the upper corners of a piston and cylinder wall showing the arrangement of the ring material shown in Figs. 4 and 5, in place in the cylinder bore of a reciprocating engine:

Fig. 9 shows one form of assembling such a ring in the bore of a cylinder, and

Fig 10 illustrates the preferred embodiment of the present invention, as will be discussed further along in this specification.

Referring to the drawing illustrating my invention, 10 indicates a ribbon of hard material, as high carbon steel. 11 indicates a ribbon of low carbon steel, the two being welded together at one edge as shown at 12 to form one solid ribbon of material but of really duplex character. Iron may be substituted for the low carbon steel, if desired, or any other similar combination of metal may be used.

The ribbon formed from the separate ribbons 10 and 11, is now folded up on itself as shown in Figs. 2 and 3, producing a series of oppositely opposed binds or loops 13, the sides 14 of which have been compressed together at 15 but not compressed so close that a small amount of space at 15 is entirely eliminated.

The various figures showing the ring material are somewhat diagrammatic and greatly exaggerated for the purpose of simplicity, as a ring of this type may be as small as one eighth of an inch in cross-section and be made up of a great multiplicity of laminations such that to the eye it comprises a solid form of metal, yet, actually there may be a fraction of a thousandth of an inch between each of the laminations and when the material is compressed lengthwise it will contract as much as a quarter of an inch more or less, depending upon the gauge of the material used. If desired the material shown in Figs. 3, 4, and 5, may be slightly stretched after having been compressed as shown in Fig. 3, but if composed of thin ribbon metal it is difficult to compress the laminations together hard enough to prevent them from expanding slightly when the pressure is removed. This is particularly true when metal such as steel is incorporated in the ring as at 10.

The material shown either at Figs. 4 or 5 may be shaped up into a ring 16 as shown in Fig. 6, having a dove-tailed end 17 in which the laminated edges 18 bear against the inner wall 19 of the cylinder block 20, the ring being first mounted in the groove 21 of a piston 22 as shown in Fig. 7 after which the piston and rings are drawn down into the cylinder block 20, as shown in Fig. 9, by means of a tapered cone 23, the tapered wall 24 causing the laminations of the ring 16 to compress together. After having been drawn into the cylinder block 20, as above described, the ring 16 exerts a radial pressure upon the wall 19 of the cylinder block 22 readily conforming to any irregular outline of such wall to the end that all compression leaks are stopped. If desired the lower side 25 of the ring may be left unhammered to form a scalloped edge 26 for the purpose of oil control and also for the purpose of maintaining an oil pressure behind the ring in the groove 21, such that piston slap may be materially reduced due to the hydraulic effect exerted between the ring 16 and piston 22.

If desired, the material shown in Figs. 4 or 5 may be made in a straight bore and wrapped around the groove 21 when placed on the piston. In this case the compressibility of the ring material is greatly increased because the laminations tend to open up on the periphery of the ring and compress on the inner diameter, and a resiliency is created throughout the length of the ring material.

It will be seen from an observation of the drawings that even though these laminations do open a small amount on the periphery of the ring, yet there is no direct passage through the material as the bottom of each opening is closed.

Likewise, the under side of the ring material opens without any direct passage up through the material and the lower openings take on a deposit of lubricant such that the cylinder wall is properly lubricated without actually passing oil by the top bends of the ring. It will thus be seen that in a ring of this type I have combined the benefits of an oiling ring and a compression ring having great flexibility and of minimum wall pressure.

If desired, a light expander wire may be used behind the ring in the piston groove 21, as has been done in the past, for increasing the radial pressure on the walls of the cylinder.

It should be observed that throughout this present application the packing ring described is a closed end ring, the two ends always being compressed together, which is radically different from cast iron rings in which the ends are not in contact except at their overlapping tops or bottoms for the purpose of reducing blow-by of gases and oil.

Each space 15 between the laminations of this ring presents an oiled surface, and such surfaces may be multiplied thousands of times where thin ribbons comprise the ring material.

The total length of this ring in its normal condition is properly proportioned with respect to its mechanical compression and expansion and other compression and expansion created by heat in the metal itself and of oil in the spaces 15 of the ring material.

The present invention to which the claims of this application are restricted is illustrated at Fig. 10, which is similar in every respect to all the other views except that the side of the ring facing the back of the piston ring groove is slotted to a point near the center of the ring as shown at 30 and an open ended circular spring wire is inserted corresponding to the member 31 illustrated in the fragmentary ring portion.

This spring 31 supports the ring corrugations at the points 32 and prevents premature bending or rupture of the ring in handling and installing as the metal at this point is somewhat weakened due to the sharp bending at this point.

In addition to this strengthening feature, the spring wire 31 also allows very thin metal ribbon to be used and supplies the necessary cylinder bore pressure.

The wire 31 is not solidly held in the groove 30 but may work lengthwise in the groove as the ring contracts and expands. If desired, the extreme outer portion of the groove 30 may be slightly closed to prevent this spring from accidentally dropping out of place in handling.

Having thus described my invention, what I claim as new, is

1. A flexible packing ring comprising a folded metal ribbon the friction side of said ring being composed of relatively soft metal, the opposite back side of said ring being composed of hard tempered metal, the said ring having an annular groove radially disposed around the inner side of the ring adjacent its radial center axis, the said groove extending to a point approximately at the center of the cross-sectional area of said ring, an open-ended expander wire adapted to engage in said groove for the purpose of producing transverse thrust in said ring and to support the ring material.

2. A flexible piston packing ring comprising a unitary ribbon of metal alternately folded upon itself, said ribbon comprising a plurality of ribbons each of varying degrees of hardness welded together at adjoining edges, the edges of the softer material adapted to operate on the inner walls of a cylinder, the said ring having an annular groove radially disposed around the inner side of the ring adjacent its radial center axis, the said groove extending to a point approximately at the center of the cross-sectional area of said ring, an open-ended expander wire adapted to engage in said groove for the purpose of producing transverse thrust in said ring and to support the ring material.

3. A flexible packing ring for pistons and the like, comprising a plurality of alternately and closely associated corrugations formed from a duplex metal ribbon, said ribbon comprising two ribbons having different degrees of hardness welded to each other along one edge, said ring adapted to present the outer edge of the softer material to the inner wall of a cylinder bore, the harder material adapted to produce spring resiliency in the ring when compressed lengthwise, the said ring having an annular groove radially disposed around the inner side of the ring adjacent its radial center axis, the said groove extending to a point approximately at the center of the cross-sectional area of said ring, an open-ended expander wire adapted to engage in said groove for the purpose of producing transverse thrust in said ring and to support the ring material.

4. A flexible packing ring for pistons and the like, comprising a multiplicity of vertically disposed laminations formed by reversally bending a metal ribbon upon itself, the tops and bottoms of said bends being flattened off into a uniform flat plane, the outer wearing periphery of said ring comprising relatively soft material for friction purposes, the back inner periphery of said ring comprising tempered spring material for the purpose of resiliency when the said ring is compressed lengthwise, the said ring having an annular groove radially disposed around the inner side of the ring adjacent its radial center axis, the said groove extending to a point approximately at the center of the cross-sectional area of said ring, an open-ended expander wire adapted to engage in said groove for the purpose of producing transverse thrust in said ring and to support the ring material, substantially as shown and described.

5. A flexible packing ring for pistons and the like, composed of duplex metal ribbons welded together at the inner edges thereof, said ring comprising a plurality of vertically corrugated laminations, one of said duplex ribbons adapted to form a soft metal wearing surface on the inner cylinder wall of a cylinder bore, the other duplex ribbon welded thereto comprising tempered material and adapted to be compressed longitudinally of said ring when confined within said cylinder, the tops of said corrugated laminations hammered to present a scalloped surface for the purpose of oil control and reduction of piston slap, the said ring having an annular groove radially disposed around the inner side of the ring adjacent its radial center axis, the said groove extending to a point approximately at the center of the cross-sectional area of said ring, an open-ended expander wire adapted to engage in said groove for the purpose of producing transverse thrust in said ring and to support the ring material, substantially as shown and described.

In testimony whereof I have affixed my signature.

THOMAS A. BOWERS.